(12) United States Patent
Alamoudi et al.

(10) Patent No.: US 12,297,392 B2
(45) Date of Patent: May 13, 2025

(54) MICROWAVE ASSISTED OIL-WATER SEPARATOR

(71) Applicant: Saudi Arabian Oil Company, Dhahran (SA)

(72) Inventors: Saeed M Alamoudi, Ras Tanura (SA); Mohammed Alwani, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 481 days.

(21) Appl. No.: 17/652,942

(22) Filed: Mar. 1, 2022

(65) Prior Publication Data

US 2023/0279299 A1    Sep. 7, 2023

(51) Int. Cl.
| | |
|---|---|
| *C10G 33/02* | (2006.01) |
| *B01D 17/02* | (2006.01) |
| *B01D 17/04* | (2006.01) |
| *B01D 17/06* | (2006.01) |
| *B01D 17/12* | (2006.01) |
| *C10G 33/06* | (2006.01) |
| *C10G 33/08* | (2006.01) |

(52) U.S. Cl.
CPC ......... *C10G 33/02* (2013.01); *B01D 17/0208* (2013.01); *B01D 17/042* (2013.01); *B01D 17/047* (2013.01); *B01D 17/06* (2013.01); *B01D 17/12* (2013.01); *C10G 33/06* (2013.01); *C10G 33/08* (2013.01)

(58) Field of Classification Search
CPC ........ C10G 33/02; C10G 33/08; C10G 33/06; B01D 17/12; B01D 17/042; B01D 17/0208; B01D 17/06; B01D 17/047
See application file for complete search history.

(56) References Cited

U.S. PATENT DOCUMENTS

| | | |
|---|---|---|
| 4,810,375 A | 3/1989 | Hudgins et al. |
| 4,853,119 A | 8/1989 | Wolf et al. |
| 4,889,639 A | 12/1989 | Hudgins et al. |
| | (Continued) | |

FOREIGN PATENT DOCUMENTS

| | | | |
|---|---|---|---|
| CN | 2765652 Y | 3/2006 | |
| CN | 105833566 A | 8/2016 | |
| GB | 2463274 A | * 3/2010 | ............. B01D 17/02 |

OTHER PUBLICATIONS

GB Gentili, "A Coaxial Microwave Applicator for Direct Heating of Liquids Filling Chemical Reactors", IEEE transactions on microwave theory and techniques, Sep. 2009.
(Continued)

*Primary Examiner* — Youngsul Jeong
(74) *Attorney, Agent, or Firm* — Leason Ellis LLP (57) ABSTRACT

A system and method for oil and water separation of a crude oil composition are provided. The system includes a gravity dehydrator vessel, a heat exchanger upstream of the gravity of the dehydrator vessel, and a plurality of metallic grids located within the gravity dehydrator vessel. The system further includes a mesh metal structure within the gravity dehydrator vessel, a microwave generator operatively connected to the gravity dehydrator vessel, and a waveguide carrying microwave energy from the microwave generator. The system and method separate water and emulsions from the crude oil composition by forming an upper crude oil layer, a middle oil-water emulsion layer, and a lower oily water layer.

15 Claims, 3 Drawing Sheets

(56) References Cited

U.S. PATENT DOCUMENTS

| | | | |
|---|---|---|---|
| 5,911,885 | A | 6/1999 | Owens |
| 5,914,014 | A | 6/1999 | Kartchner |
| 6,086,830 | A | 7/2000 | Kartchner |
| 6,994,774 | B2 | 2/2006 | Burkitbaev |
| 7,705,058 | B2 | 4/2010 | Coutinho et al. |
| 7,914,688 | B2 | 3/2011 | Anderson et al. |
| 8,646,524 | B2 | 2/2014 | Al-Buraik |
| 8,653,148 | B2 | 2/2014 | Cha |
| 8,807,214 | B2 | 8/2014 | Khan et al. |
| 9,555,345 | B2 | 1/2017 | Al-Shafei et al. |
| 10,745,301 | B2 * | 8/2020 | Mandewalkar .... B01D 17/0214 |
| 2006/0011563 | A1 | 1/2006 | Meikrantz |
| 2007/0184962 | A1 | 8/2007 | Meikrantz |
| 2008/0169222 | A1 * | 7/2008 | Ophus .................... C10G 1/047 |
| | | | 196/14.52 |
| 2011/0136923 | A1 | 6/2011 | Cha |
| 2018/0334621 | A1 * | 11/2018 | Amminudin ......... B01D 17/042 |

OTHER PUBLICATIONS

A. Porch, "Microwave treatment in oil refining", Applied Petrochemical Research, Aug. 2012.

Nour et al., "Demulsification of Water-in-Oil Emulsions by Microwave Heating Technology", World Academy of Science, Engineering and Technology, Feb. 2010.

Santos et al., "Demulsification of Water-in-Crude Oil Emulsions using Single Mode and Multimode Microwave Irradiation", Separation and Purification Technology, Aug. 2017.

Office Action in Corresponding Saudi Arabian Application No. 123441310 mailed Jun. 30, 2024; 11 pages.

\* cited by examiner

MICROWAVE ASSISTED OIL-WATER SEPARATOR

TECHNICAL FIELD

The present application generally relates to methods and systems for enhancing oil and water separation. More particularly, the present application relates to methods and systems for oil and water separation of a crude oil composition.

BACKGROUND OF THE DISCLOSURE

While other energy sources have become increasingly important, crude oil remains a primary energy source throughout the world. Crude oils retrieved from reservoirs are often in the form of water-in-oil emulsions, with varying water contents. Thus, in oil and gas facilities, in order to prepare these crude oils for various energy needs, the crude oils must first be processed to separate the water from the crude oil.

There are several conventional techniques for separating water from oil in the crude oil emulsion, including the use of chemical demulsifiers, microwave energy, and electrostatic coalescers. However, each of these techniques have their own drawbacks. For example, the use of chemical demulsifiers often results in high quantities of chemical demulsifiers remaining in the water after separation of the oil and water, which can result in toxic effects in aquatic environments. Conventionally, microwave-based separation techniques have been used in single-mode resonance applicators, which have a very small cross-sectional area when compared to crude oil piping in oil production facilities. As such, sufficient exposure time of the microwaves to the crude oil emulsion is difficult to achieve. Likewise, conventional electrostatic coalescers are generally large settling tanks that contain electrodes and operate under laminar flow conditions and use frequencies at the range of 0-50 kHz due to the higher resistance provided by oil. This phenomenon is related to crude oil dielectric loss which is a function of frequency.

Finally, conventional separation methods have struggled to adequate separate water from oil in crude oil composition that have a high water content or have tight oil-water emulsions.

The present application addresses these and other challenges related to the separation of oil and water from crude oil compositions.

SUMMARY OF THE DISCLOSURE

In a first aspect, a system for oil and water separation of a crude oil composition is provided. The system includes a gravity dehydrator vessel having a shell wall, as well as an inlet that is configured to receive the crude oil composition and a demulsifier agent. The system also includes a heat exchanger upstream of the gravity of the dehydrator vessel, the heat exchanger being configured to heat the crude oil composition via steam heating. The system also includes a plurality of metallic grids located within the gravity dehydrator vessel and made from electrically conducting material. The metallic grids are partially bonded to form two electrically isolated sets of grids, and one of the two sets of grids is electrically bonded to the shell wall of the gravity dehydrator vessel. The system also includes a mesh metal structure made from electrically conducting material that forms a faraday cage within the gravity dehydrator vessel, a microwave generator operatively connected to the gravity dehydrator vessel, and a waveguide carrying microwave energy from the microwave generator. The waveguide is terminated through the shell wall of the gravity dehydrator vessel and into the faraday cage forming a microwave port. The system is configured to separate water and emulsions from the crude oil composition by forming an upper crude oil layer, a middle oil-water emulsion layer, and a lower oily water layer.

In another aspect, the system further includes one or more controllers. The one or more controllers are configured to adjust at least one of: a steam flow rate of the heat exchanger steam, a dosage rate of the demulsifier agent, power of the microwave energy from the microwave generator, and voltage of the metallic grids.

In another aspect, the metallic grids are oriented horizontally, vertically, or diagonally with respect to a bottom surface of the gravity dehydrator vessel.

In another aspect, a distance between the metallic grids is selectively adjustable.

In another aspect, the metallic grids are located in an upper half of the gravity dehydrator vessel, and wherein the metallic grids are configured to enhance separation of oil and water in the upper crude oil layer via control of the voltage of the metallic grids.

In another aspect, the waveguide terminates from a top portion, bottom portion, or side portion of the shell wall of the gravity dehydrator vessel. In a further aspect, the waveguide terminates within the faraday cage.

In another aspect, the system further includes a demulsifier pump configured to inject the demulsifier agent into the gravity dehydrator vessel via the inlet.

In another aspect, the system further includes a transformer operatively connected to the metallic grids.

In another aspect, cross-sectional areas of the faraday cage are fixed or variable to accommodate changing layer thickness of the crude oil composition.

In a second aspect, method for oil and water separation of a crude oil composition is provided. In the method, the crude oil composition is steam heated via a heat exchanger. The crude oil composition and a demulsifier agent are then injected via an inlet device into a gravity dehydrator vessel. Electromagnetic radiation is applied to the crude oil composition via a microwave generator and a waveguide, and the electromagnetic radiation causes polarization of molecules of the crude oil composition. A plurality of metallic grids located within the gravity dehydrator vessel and made from electrically conducting material are energized with an electrical potential source, and the metallic grids are partially bonded to form two electrically isolated sets of grids. The energized metallic grids, electromagnetic radiation, the demulsifier agent, and gravity cause separation of the crude oil composition into an upper crude oil layer, a middle oil-water emulsion layer, and a lower oily water layer.

In another aspect, one or more separation parameters of the gravity dehydrator vessel are adjusted via one or more controllers. The separation parameters include the steam flow rate of the heat exchanger steam, the dosage rate of the demulsifier agent, the power of the microwave energy from the microwave generator, and the voltage of the metallic grids.

In another aspect, the electrical potential source is of a frequency in a range from 0 Hz to 100 KHz.

In another aspect, the step of injecting the crude oil composition into the gravity dehydrator vessel includes absorbing, via the inlet device, some momentum of the crude oil composition prior to the composition entering the gravity dehydrator vessel, wherein the absorption of momentum reduces turbulence of the crude oil composition.

In another aspect, the voltage of the metallic grids is adjusted to enhance separation of oil and water in the upper crude oil layer.

In another aspect, the step of applying electromagnetic radiation comprises adjusting the intensity of microwaves emitted by the microwave generator based on permittivity of the crude oil composition.

In another aspect, the distance between the metallic grids is adjusted to minimize the electrical current.

DETAILED DESCRIPTION OF CERTAIN EMBODIMENTS

The present application describes systems and methods for separation of oil and water in a crude oil composition. The present systems and methods rely on a combination of gravitational, thermal, chemical, electrostatic and microwave techniques for achieving desired oil and water phase separation, which helps to produce a final crude oil according to desired specifications, including water content. More specifically, the systems and methods of the present application can utilize multi-modes of separation and demulsification including an injection of one or more demulsifiers, steam heating, microwave heating, gravity, and electrostatic modes of separation.

In accordance with one or more embodiments, the system for oil and water separation can include a gravity dehydrator vessel that receives the crude oil composition to be separated or demulsified. The crude oil composition includes crude oil and water in the form of an emulsion. The gravity dehydrator vessel can include a plurality of metallic grids, a mesh metal structure that forms a faraday cage, at least one microwave generator and a waveguide connected to the microwave generator. In the use of the present system in accordance with one or more embodiments, the crude oil composition and a demulsifier agent are injected into the gravity dehydrator vessel. Once in the gravity dehydrator vessel, electromagnetic radiation is applied to the crude oil composition via the microwave generator and the waveguide, and the plurality of metallic grids are energized via an electrical potential source to produce an electric field that acts on the crude oil composition. The application of the electromagnetic radiation and electrical potential energy, along with the injected demulsifier and gravitational forces cause enhanced separation of the crude oil composition in all three layers: the upper crude oil layer, the middle oil-water emulsion layer, and the lower oily water layer. As such, the present methods and systems, via separation of oil and water in the unprocessed crude oil compositions, can produce processed crude oil of desired specifications.

These and other aspects of the present systems and methods are described in further detail below with reference to the drawing figures.

Figure 1:
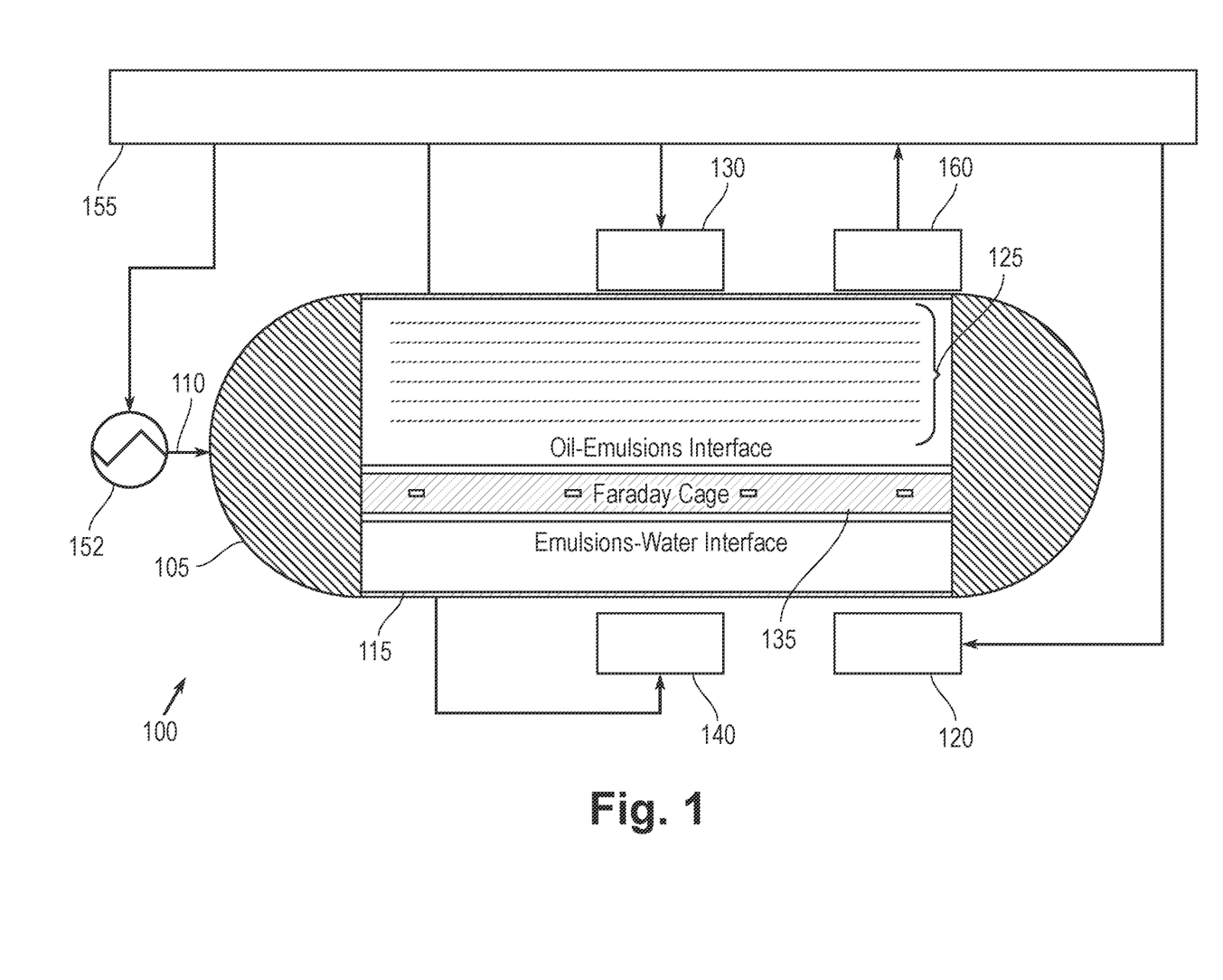
FIG. 1 shows a diagram of an exemplary system for oil-water separation of crude oil compositions in accordance with one or more embodiments.
Figure 2:
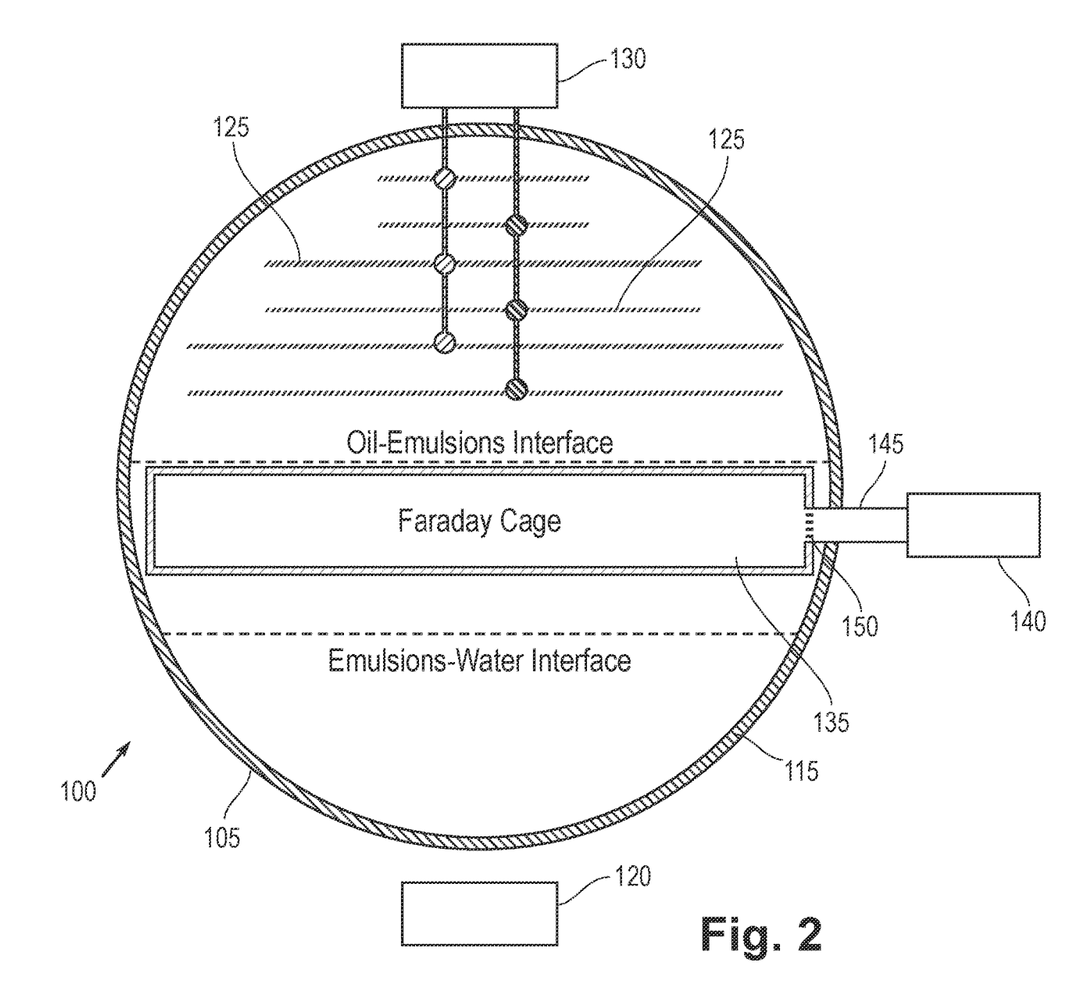
FIG. 2 shows a diagram of the exemplary system for oil-water separation of crude oil compositions from a side view in accordance with one or more embodiments.

FIG. 1 shows a diagram of an exemplary system 100 for oil-water separation of crude oil compositions in accordance with one or more embodiments. FIG. 2 shows a side view of the exemplary system 100 for oil-water separation in accordance with one or more embodiments. With reference to FIGS. 1 and 2, the system 100 includes a gravity dehydrator vessel 105, which includes an inlet 110 and a shell wall 115. The shell wall 115 is has a length (L) and a shell inner diameter (ID) and a designated settling time (T) for the crude oil can be specified depending on the contents of the crude oil composition. In one or more embodiments, the length (L) of the shell wall 115 is approximately 30-50 meters. In one or more embodiments, the shell inner diameter (ID) is approximately 4-5 meters. The settling time T can allow for gravitational forces to begin to act on the crude oil composition to begin separation of the phases. In one or more embodiments, the settling (retention) time (T) is a minimum of 5 minutes. As mentioned above, during separation of the crude oil composition in the vessel 105, the crude oil composition separates upper crude oil layer, a middle oil-water emulsion layer, and a lower oily water layer. As shown in FIGS. 1 and 2, the upper crude oil layer forms above the oil-emulsion interface, the (oily) water layer forms below the emulsions-water interface, and the middle oil-water emulsion layer forms in between the two interfaces.

The inlet 110 is configured to receive the crude oil composition and at least one demulsifier agent. In one or more embodiments, the inlet 110 is a high-efficiency inlet device that absorbs a portion of the momentum of the received crude oil composition (bulk fluid) such that the turbulence of the crude oil composition is reduced in the gravity dehydrator vessel 105. This reduction of turbulence in the crude oil composition contributes to increased phase separation of the oil and water in the gravity dehydrator vessel 105.

The at least one demulsifier agent can be one or more chemical demulsifier agents. The one or more chemical demulsifier agents can include but are not limited to, epoxy resins, polyethyleneimines, phenol-formaldehyde resins, polyamines, di-epoxides, polyols, dendrimers, or a combination thereof. In one or more embodiments, the demulsifier agent can be injected into the gravity dehydrator vessel 105 via a demulsifier pump 120. In one or more embodiments, the amount of demulsifier agent injected into the vessel is approximately 2-5 ppm. In one or more embodiments, the demulsifier agent is pumped into the inlet 110 such that the demulsifier agent enters the gravity dehydrator vessel 105 with the crude oil composition or at the same time as the crude oil composition (e.g., via separate conduits in the inlet 110). In at least one embodiment, the demulsifier agent is injected via the demulsifier pump 120 into the gravity dehydrator vessel 105 via an inlet that is separate from the inlet 110. The presence of a demulsifier agent in the crude oil composition results in increased coalescence of water droplets during the separation process.

With continued reference to FIGS. 1 and 2, the system 100 also includes a plurality of metallic grids 125 located within the shell wall 115 of the gravity dehydrator vessel 105.

The metallic grids 125 are made from one or more electrically conducting materials such as aluminum and copper. In one or more embodiments, the metallic grids 125 are partially bonded to each other to form two electrically isolated sets of grids. The two electrically isolated sets of grids 125 can be electrically connected to one or more transformers 130 (FIG. 2). In one or more embodiments, the connection between the transformers 130 and the metallic grids 125 is done through bushings to accommodate pressure difference. Multiple configurations are possible including three wires two phases, or double wires single phase with wires bonded to meshes and the body of the gravity dehydrator vessel 105 (e.g., shell wall 115). When applicable, the transformers 130 can be equipped with motorized tap changers for variable supplied electric potential used as a means of process control. In one or more embodiments, the two electrically isolated sets 125 can be placed in an alternating sequence as shown in FIG. 2. One of the two isolated sets of grids 125 can be electrically bonded or unbonded to the shell wall 115 of the gravity dehydrator vessel 105. In one or more embodiments, the metallic grids 125 can be separated from each other by a fixed distance. In at least one embodiment, the distance between the metallic grids 125 can be variable by adjusting the placement of one or more of the metallic grids 125. In such an embodiment, the metallic grids 125 can be selectively detachable from the shell wall, and can be reattached at other locations along the shell wall. The metallic grids 125 can be oriented in a horizontal, vertical, or diagonal direction with respect to a horizontal surface on which the gravity dehydrator vessel sits.

The metallic grids 125 are located in the upper half of the gravity dehydrator vessel 105, and can be configured to enhance separation of oil and water in the upper crude oil layer. As mentioned above, the metallic grids 125 are partially bonded to each other to form two electrically isolated sets of grids. The two sets of metallic grids 125 are energized with an electrical potential source of a frequency that is fixed or variable and can range from DC (0 Hz) to 100 KHz. The metallic grids 125 can employ direct current (DC) or alternating current (AC) electric fields, or a combination of both. In certain embodiments that employ direct current (DC), the two sets of metallic grids 125 can be connected to different poles. In certain embodiments that employ alternating currents (AC), the two sets of metallic grids 125 can be connected to different terminals of the transformer 130. The electrical current can be minimized by tuning the distance between the metallic grids 125. Other factors that are considered for tuning the electrical current for enhance separation are the frequency of the electrical potential source, magnitude of electrical potential applied, and physical and chemical parameters of the crude oil composition to be separated, such as its dielectric constant and water concentration. Current sensing equipment, including interface level monitoring equipment and circuit breakers, can also be operatively connected to the gravity dehydrator vessel 105 to ensure that the electrical current is kept at a minimum for safety purposes.

The two electrically isolated sets of metallic grids 125 are used to reduce water content in crude oil to meet specifications of a desired final crude oil product. More specifically, the metallic grids 125 expose the crude oil composition to electric fields, which produce a force on polarized and ionic molecules in trapped water droplets of the crude oil composition. Because the metallic grids 125 are located in the upper half of the gravity dehydrator vessel, the electric fields aid in oil-water separation in the upper crude oil layer of the crude oil composition. By adjusting the voltage of the electrical field, separation of oil and water in this layer is controlled. Moreover, the crude oil in the upper crude oil layer acts as a dielectric material and resists the flow of current, thereby aiding in oil/water separation upon the application of the electric field.

The gravity dehydrator vessel 105 also includes at least one mesh metal structure 135 that is made from at least one electrically conducting material such as copper or aluminum. The at least one mesh metal structure 135 forms one or more faraday cages within the gravity dehydrator vessel 105. The mesh structure 135 is located in a middle portion of the gravity dehydrator vessel 105 and is located within the middle oil-water emulsion layer (emulsion phase layer) of the crude oil composition during separation in the gravity dehydrator vessel 105. The one or more faraday cages have a cross-sectional area that can be fixed or can be variable to accommodate changing layer thickness of the oil-water emulsion layer within the vessel. In one or more embodiments, the faraday cages can touch the shell wall of the gravity dehydrator vessel 105 and can be formed in part using the shell wall 115 in embodiments in which the shell wall 115 is made from or coated with electrically conducting material.

With continued reference to FIG. 1, the system 100 can further include a microwave generator 140 operatively connected to the gravity dehydrator vessel 105. The system 100 also includes at least one waveguide 145 connected to the microwave generator 140 and configured to carry microwave energy from the microwave generator 140 into the gravity dehydrator vessel 105. In one or more embodiments, the at least one waveguide 145 terminates through a shell wall 115 of the gravity dehydrator vessel 105 forming a microwave port 150. In one or more embodiments, as shown in FIG. 2, the at least one waveguide 145 terminates through the shell wall 115 and into the faraday cage (mesh structure 135). The waveguide 145 (via microwave port 150) can terminate from a top surface, bottom surface, or side surface of the shell wall 115 of the gravity dehydrator vessel 105. In one or more embodiments, the microwave port 150 has dimensions D×B and D>B, where D is the rectangular port length and B is the rectangular port width. Termination of the waveguide 145 within the gravity dehydrator vessel 105 can be accomplished via a horn antenna or without horn antenna.

In one or more embodiments, the crude oil composition (n) to be separated has penetration depths of ($\delta_{pn}$), and a complex permittivity ($\varepsilon'_n$-$i\varepsilon''_n$) at a microwave source frequency of (f) and wavelength ($\lambda$). The microwave source frequency from the microwave generator 140 can be selected based on the permittivity of the crude oil composition to be separated, the dimensions of the gravity dehydrator vessel 105, and/or governmental regulations. In one or more embodiments, the microwave source frequency can be 915 MHz, 2.45 GHz, or 5.8 GHz.

In one or more embodiments, the microwave generator 140 and waveguide 145 can be operatively connected to an active/passive impedance matching device, which can be used to increase efficiency and reduce reflected power of the microwaves. Power can be delivered to the microwave generator 140 using a switched or continuous mode power supply. In one or more embodiments, a circulator can be installed between the impedance matching device and the microwave generator 140 for the protection of microwave generator 140 from reflected waves. Additionally, in at least one embodiment, a properly rated microwave transparent (lossless) window can be used to hold pressure and prevent fluid leakage to the microwave circuit.

Emulsion phase separation in the middle oil-water emulsion layer of the crude oil composition is controlled through the magnitude and duration of the delivered microwave power. The microwaves can be delivered for 0% to 100% of the duration of the time that the crude oil composition is within the vessel 105, depending on the crude oil composition and the type of separation that is needed at the time. More specifically, microwave radiation causes polarization of molecules and rotation (movement) in response to applied time-varying electric field. Movement increase molecules rotation and due to polarity, molecules like water constantly align themselves with that electro-magnetic field they are subjected to and as a result enhance the water-oil separation. Moreover, the microwave radiation heats up water molecules in the crude oil composition, thereby decreasing viscosity of the crude oil composition and improving separation.

In at least one embodiment, the system 100 can also include a heat exchanger 152 upstream of the gravity dehydrator vessel 105 wherein the heat exchanger 152 is configured to heat the crude oil composition via steam heating prior to the crude oil composition entering the gravity dehydrator vessel 105. The heat exchanger can be operatively connected to the inlet 110 and can be operatively connected to an upstream conduit. Steam heating of the crude oil composition prior to entering the gravity dehydrator vessel 105 can enhances oil and water separation once the crude oil composition enters the vessel 105. In at least one embodiment, the steam temperature is close to or approximately 390° F.

With continued reference to FIG. 1, in one or more embodiments, the system further includes one or more controllers 155 for controlling the various separation techniques of the system 100. Specifically, the one or more controllers 155 can include electronics including a processor or microprocessor configured with code in the form of software, to execute a given instruction set. The electronics are operatively connected to the other components of the system 100 such that when the processor or microprocessor executes a given instruction set, the processor can cause the other components of the system 100 to selectively perform their respective functions. For example, the one or more controllers 155 can be configured to regulate or adjust a steam flow rate of the heat exchanger steam, a dosage rate of the demulsifier agent, power of the microwave energy from the microwave generator, and voltage of the metallic grids. The one or more controllers 155 can also include an interface 160, which includes an interface transmitter. The interface 160 allows for an operator to adjust the separation parameters of the system 100, including at least the steam flow rate of the heat exchanger steam, the dosage rate of the demulsifier agent, the power of the microwave energy from the microwave generator 135, and the voltage of the metallic grids. The interface transmitter allows the controller 155 to communicate with sensors of the heat exchanger 152, demulsifier pump 120, microwave generator 135, and the metallic grids 125, for example, for controlling these separation parameters.

In one or more embodiments, in order to find a minimum operating expense (MIN OPEX) of the system 100, the controller 155 can be configured identify constants α, β, γ, and δ that relate to the process parameters of voltage, power, flow, and dosage rate levels, respectively, as indicated by the following equation:

$$\text{MIN OPEX} = \alpha * \text{Voltage}_{electrostatic\ grid} + \beta * \text{Power}_{microwave} + \gamma * \text{Flow}_{steam} + \delta * \text{Dosage Rate}_{demulsifier}.$$

In one or more embodiments, the constants α, β, γ, and δ and thus the determination of a minimum operating expense can be subject to certain constraints related to the final desired oil specifications, such as not exceeding a water content upper limit and upper and lower limits of the process parameters.

In one or more embodiments, the temperature of the crude oil composition to be separated is maintained at a range of approximately 80° F.-300° F. In one or more embodiments, transmission of the crude oil composition through the system is maintained at a pressure range of approximately 60 psig-360 psig. In one or more embodiments, the water content of crude oil composition is in a range of 0.02 to 0.2% volume of the gravity dehydration vessel 105.

Figure 3:
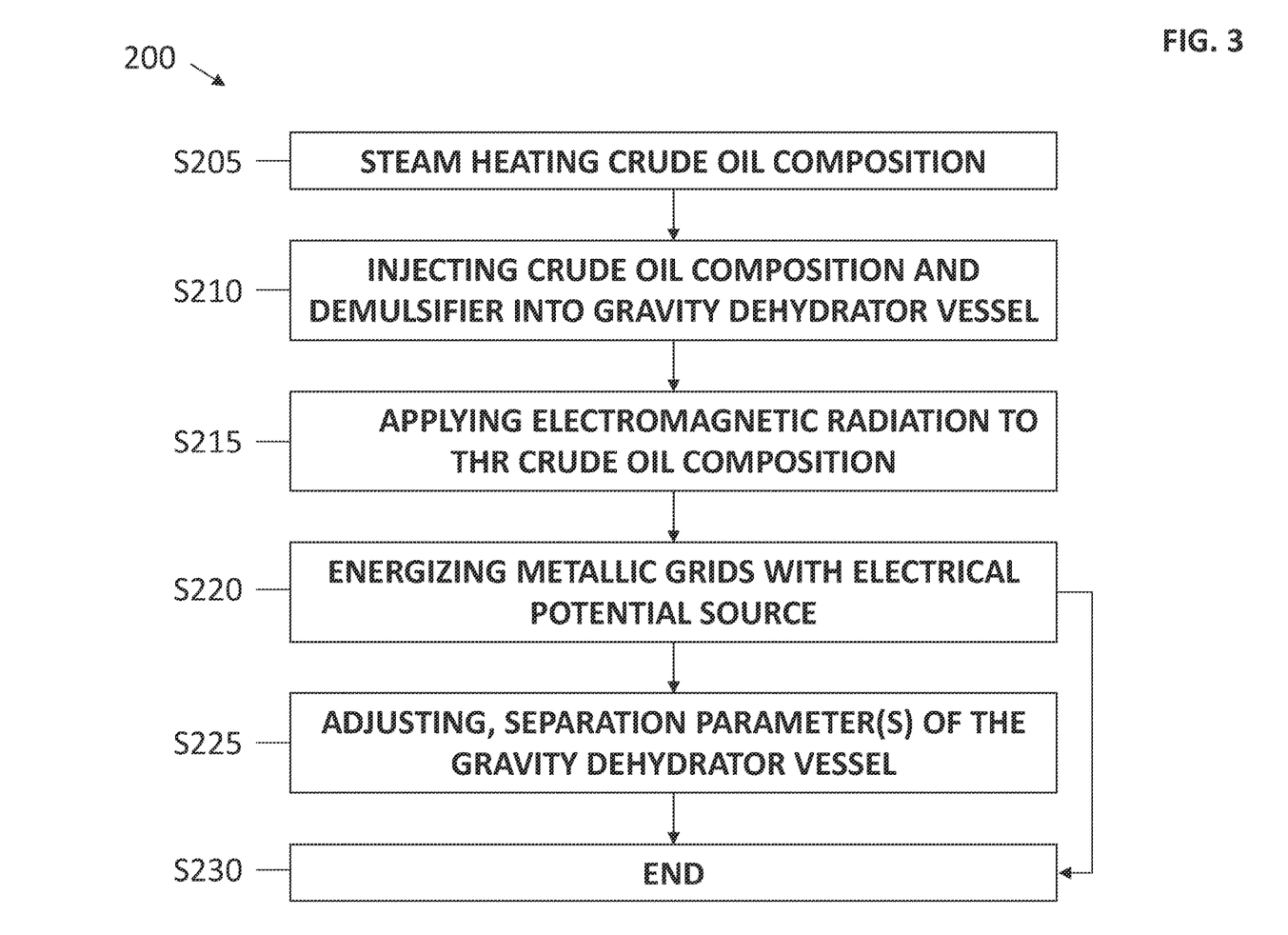
FIG. 3 shows a flow diagram of a method for oil and water separation of a crude oil composition, in accordance with one or more embodiments.

FIG. 3 discloses a flow diagram of a method 200 for oil and water separation of a crude oil composition in accordance with one or more embodiments. The method 200 can be performed via the system 100 of the present application and the method separates the crude oil composition into an upper crude oil layer, a middle oil-water emulsion layer, and a lower oily water layer. With reference to FIG. 3, at step S205 the crude oil composition first enters a heat exchanger in which the crude oil composition is steam heated upstream of the inlet of the gravity dehydrator vessel.

At step S210, the crude oil composition and at least one demulsifier agent are injected, via an inlet device, into the gravity dehydrator vessel. As discussed above, in one or more embodiments, the at least one demulsifier agent can comprise one or more chemical demulsifier agents. Additionally, in one or more embodiments, as part of the step of injecting the crude oil composition and the demulsifier agent into a gravity dehydrator vessel, momentum of the crude oil composition is absorbed via the inlet device prior to the composition entering a gravity dehydrator vessel. Absorption of momentum of the crude oil composition by the inlet device reduces turbulence of the crude oil composition upon entry into the gravity dehydrator vessel. Additionally, in one or more embodiments, step S210 can further include allowing the injected crude oil composition to settle within the gravity dehydrator vessel for a designated settling time (T), which can be specified based on the contents of the crude oil composition.

With continued reference to FIG. 3, at step S215 electromagnetic radiation is applied to the crude oil composition via a microwave generator and a waveguide. As discussed above, the electromagnetic radiation (microwaves) causes polarization of molecules of the crude oil composition. In one or more embodiments, the step of applying electromagnetic radiation can comprise adjusting the duration or power of the microwaves emitted by the microwave generator based on permittivity of the crude oil composition.

At step S220, a plurality of metallic grids located within the gravity dehydrator vessel are energized with an electrical potential source of a frequency that is in a range from DC (0 Hz) to 100 KHz. The metallic grids are made from electrically conducting material and are partially bonded to form two electrically isolated sets of grids. In one or more embodiments, the distance between the metallic grids can be adjusted, preferably before injection of the crude oil composition. Adjustment of the distance between the metallic grids can be done to minimize the electrical current applied to the crude oil composition by the metallic grids. Additionally, in one or more embodiments, the voltage of the metallic grids can be adjusted to enhance separation of oil and water in the upper crude oil layer.

The energized metallic grids, electromagnetic radiation, the demulsifier agent, and gravitational force acting on the crude oil composition causes separation of the crude oil composition into an upper crude oil layer, a middle oil-water emulsion layer, and a lower oily water layer. In one or more embodiments, water and/or the emulsion phase can then be removed from the separated crude oil composition. For example, the water or the emulsion phase can be removed via physical gravity separation. Specifically, in one or more embodiments, because the density of water is 1 g/cm$^3$ and the crude oil density usually varies between 0.7-0.95 g/cm$^3$, the density difference allows the water and emulsion phase to separate, with water settling down at the bottom of the vessel 105.

In at least one embodiment, the method can further include step S225, which is a step of adjusting, via one or more controllers, one or more separation parameters of the gravity dehydrator vessel, wherein the separation parameters include the steam flow rate of the heat exchanger steam, the dosage rate of the demulsifier agent, the power of the microwave energy from the microwave generator, and the voltage of the metallic grids. In at least one embodiment, this additional step can be performed before the crude oil composition has been injected into the gravity dehydrator vessel. In one or more embodiments, this step of adjusting the separation parameters is performed after the crude oil composition has been injected into the gravity dehydrator vessel to further enhance oil and water separation. For example, in at least one embodiment, once oil and water separation has begun according to a first set of separation parameters, the separation parameters can then be adjusted to further enhance separation if the first separation parameters are not sufficient for optimal separation. In one or more embodiments, the separation parameters can be determined before the crude oil composition enters the system such that no adjust step S225 is needed. At step 230, the method ends.

Overall, the present application provides improved methods and systems for oil and water separation of a crude oil composition. Specifically, the system and method of the present application targets all three layers (oil layer, emulsion layer, water layer) of the crude oil composition, for separation of water droplets and emulsions from crude oil. More specifically, the present systems and methods target the three layers of the crude oil composition with distinct separation techniques that are specifically targeted to the respective layers in order to enhance oil and water separation. For example, the low frequency electric field, as applied by the metallic grids in the upper portion of the gravity dehydrator vessel targets the upper crude oil layer due to the dielectric nature of that layer and high resistance to electric current as compared with the middle layer (emulsion phase layer). Likewise, the present system and method targets the middle layer (emulsion phase layer) with microwave frequency radiation (via the microwave generator) as water is more responsive to microwave frequencies than oil. Thus, the water molecules of the middle layer are selectively targeted as oil is partially transparent (low loss) for such radiation. As such, these two techniques operating on the upper layer and the middle layer of the crude oil composition, respectively, are based on different physical and chemical phenomenon including trapped water droplet movement in response to exposure to electric field (upper layer) and polar molecule rotation and heating in response to electromagnetic microwave radiation.

In the present system, the microwave source (microwave generator) is also incorporated as part of the gravity dehydration vessel, rather than as a detached or supplemental separation apparatus. In conventional methods and systems, microwave radiation has been used in a single-mode resonance applicator which has a very small cross-sectional area when compared to crude oil piping in oil production facilities. Therefore, these conventional systems have not been able to consistently achieve sufficient exposure time of the microwaves to the crude oil composition for adequate oil/water separation. The present system, however, utilizes the gravity dehydration vessel to achieve high exposure time to the microwaves by integrating the microwave generator and waveguide into the gravity dehydration vessel.

Further, while microwave radiation has conventionally been used a single separation technique, the present systems and process integrates other methods in parallel to the microwave radiation, including steam heating, the use of demulsifier agents and electrostatic separation via the metallic grids. In addition to integrating these separation techniques in a single vessel, the present system and method provides a control mechanism for controlling heat exchanger steam inlet flow rate, demulsifier pump dosage rate, microwave power, and electrostatic grids voltage, which allows the system and method to be adjustable to crude oil compositions of varying water contents and oil composition. Therefore, the integration of the above-mentioned techniques into a single vessel allows the present systems and methods to reducing energy consumption, and lower operating expenses. Moreover, the ability to adjust parameters associated with these integrated separation techniques allows the present methods and systems to achieves greater oil-water separation and reduce the use of costly chemicals.

Overall, the present systems and method ensures improved optimization of oil and gas operations, and reduce energy consumption associated with crude oil processing.

Although much of the foregoing description has been directed to systems and methods for oil and water separation of a crude oil composition, the systems and methods disclosed herein can be similarly deployed and/or implemented in scenarios, situations, and settings far beyond the referenced scenarios. It should be further understood that any such implementation and/or deployment is within the scope of the composition and methods described herein.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system for oil and water separation of a crude oil composition, comprising:
    a gravity dehydrator vessel having a shell wall and an inlet configured to receive the crude oil composition and a demulsifier agent;
    a heat exchanger upstream of the gravity dehydrator vessel, wherein the heat exchanger is configured to heat the crude oil composition via steam heating;
    a plurality of metallic grids located within the gravity dehydrator vessel and made from electrically conducting material, wherein the metallic grids are partially bonded to form two electrically isolated sets of grids, and wherein one of the two sets of grids is electrically bonded to the shell wall of the gravity dehydrator vessel;
    a mesh metal structure made from electrically conducting material that forms a faraday cage within the gravity dehydrator vessel;
    a microwave generator operatively connected to the gravity dehydrator vessel; and
    a waveguide carrying microwave energy from the microwave generator, wherein the waveguide is terminated through the shell wall of the gravity dehydrator vessel and into the faraday cage forming a microwave port;
    wherein the system is configured to separate water and emulsions from the crude oil composition by forming an upper crude oil layer, a middle oil-water emulsion layer, and a lower oily water layer, and
    wherein the metallic grids are located in an upper half of the gravity dehydrator vessel, and wherein the metallic grids are configured to enhance separation of oil and water in the upper crude oil layer via control of a voltage of the metallic grids.

2. The system of claim 1, further comprising one or more controllers, wherein the one or more controllers are configured to adjust at least one of: a steam flow rate of the heat exchanger steam, a dosage rate of the demulsifier agent, power of the microwave energy from the microwave generator, and the voltage of the metallic grids.

3. The system of claim 1, wherein the metallic grids are oriented horizontally, vertically, or diagonally with respect to a bottom surface of the gravity dehydrator vessel.

4. The system of claim 1, wherein a distance between the metallic grids is selectively adjustable.

5. The system of claim 1, wherein the waveguide terminates from a top portion, bottom portion, or side portion of the shell wall of the gravity dehydrator vessel.

6. The system of claim 5, wherein the waveguide terminates within the faraday cage.

7. The system of claim 1, further comprising a demulsifier pump configured to inject the demulsifier agent into the gravity dehydrator vessel via the inlet.

8. The system of claim 1, further comprising a transformer operatively connected to the metallic grids.

9. The system of claim 1, wherein cross-sectional areas of the faraday cage are fixed or variable to accommodate changing layer thickness of the crude oil composition.

10. A method for oil and water separation of a crude oil composition, comprising:
    steam heating, via a heat exchanger, the crude oil composition;
    injecting, via an inlet device, the crude oil composition and a demulsifier agent into a gravity dehydrator vessel;
    applying, via a microwave generator and a waveguide, electromagnetic radiation to the crude oil composition, wherein the electromagnetic radiation causes polarization of molecules of the crude oil composition;
    energizing, with an electrical potential source, a plurality of metallic grids located within the gravity dehydrator vessel and made from electrically conducting material, wherein the metallic grids are partially bonded to form two electrically isolated sets of grids, and wherein the metallic grids are located in an upper half of the gravity dehydrator vessel; and
    adjusting a voltage of the metallic grids,
    wherein the energized metallic grids, electromagnetic radiation, the demulsifier agent, and gravity cause separation of the crude oil composition into an upper crude oil layer, a middle oil-water emulsion layer, and a lower oily water layer and wherein adjustment of the voltage of the metallic grids enhances separation of oil and water in the upper crude oil layer.

11. The method of claim 10, further comprising:
    adjusting, via one or more controllers, one or more separation parameters of the gravity dehydrator vessel, wherein the separation parameters include a steam flow rate of the heat exchanger steam, a dosage rate of the demulsifier agent, power of the microwave energy from the microwave generator, and the voltage of the metallic grids.

12. The method of claim 10, wherein the electrical potential source is of a frequency in a range from 0 Hz to 100 KHz.

13. The method of claim 10, wherein the step of injecting the crude oil composition into the gravity dehydrator vessel comprises absorbing, via the inlet device, some momentum of the crude oil composition prior to the composition entering the gravity dehydrator vessel, wherein the absorption of momentum reduces turbulence of the crude oil composition.

14. The method of claim 10, wherein the step of applying electromagnetic radiation comprises adjusting an intensity of microwaves emitted by the microwave generator based on permittivity of the crude oil composition.

15. The method of claim 10, further comprising:
adjusting a distance between the metallic grids to minimize electrical current.

* * * * *